United States Patent [19]

Liao

[11] Patent Number: 5,400,627
[45] Date of Patent: Mar. 28, 1995

[54] AUTOMOBILE STEERING LOCK

[76] Inventor: Hsiu-Yun Liao, No. 209-10, Kuang-Ming Road, Taichung, Taiwan, Prov. of China

[21] Appl. No.: 214,175
[22] Filed: Mar. 16, 1994
[51] Int. Cl.⁶ ............................................. B60R 25/02
[52] U.S. Cl. ........................................ 70/209; 70/226; 70/237
[58] Field of Search ..................... 70/209–212, 70/225, 226, 238, 57, 58, 14, 18, 19

[56] References Cited

U.S. PATENT DOCUMENTS

| | | | |
|---|---|---|---|
| 3,828,593 | 8/1974 | Bolton | 70/209 |
| 4,444,030 | 4/1984 | Dausch | 70/209 |
| 4,750,341 | 6/1988 | Laguna | 70/209 |
| 4,829,797 | 5/1989 | Wu | 70/209 |
| 4,882,920 | 11/1989 | Wu | 70/209 |
| 5,024,069 | 6/1991 | Hull, Jr. et al. | 70/238 |
| 5,052,201 | 10/1991 | Liou | 70/209 |
| 5,055,823 | 10/1991 | Fuller | 70/209 |
| 5,097,685 | 3/1992 | Lien | 70/209 |
| 5,115,652 | 5/1992 | Starmer | 70/209 |
| 5,129,245 | 7/1992 | Chang | 70/209 |
| 5,163,309 | 11/1992 | Wu | 70/209 |
| 5,168,732 | 12/1992 | Chen et al. | 70/209 |
| 5,197,309 | 3/1993 | Del Rosario | 70/209 |
| 5,199,284 | 4/1993 | Lin | 70/209 |
| 5,297,406 | 3/1994 | Lin | 70/209 |

FOREIGN PATENT DOCUMENTS 106779  3/1967  Denmark ....................... 70/238

Primary Examiner—Peter M. Cuomo
Assistant Examiner—Suzanne L. Dino
Attorney, Agent, or Firm—Morton J. Rosenberg; David I. Klein

[57] ABSTRACT

An automobile steering lock includes a lock body having a spring plate at the top, a substantially U-shaped mounting frame having one side hinged to the lock body and a second side made with two spaced through holes, a locating bar having two parallel lock bolts perpendicularly extended from a coupling end thereof and respectively inserted through the through holes on the mounting frame and locked in two lock holes on the lock body permitting the spring plate of the lock body and the mounting frame to be stopped against an automobile's steering wheel at two opposite sides to lock it in position as the locating bar is stopped between the instrument panel and windshield of the automobile.

6 Claims, 6 Drawing Sheets

AUTOMOBILE STEERING LOCK

BACKGROUND OF THE INVENTION

The present invention relates to an automobile steering lock for locking the steering wheel of an automobile.

Various lock devices for automobiles have been disclosed, and have appeared on the market. FIG. 1 shows an automobile steering lock according to the prior art which is generally comprised of a lock body and two hooked lock bolts fastened to the lock body at two opposite sides and respectively hooked on the steering wheel and the brake pedal (or accelerator pedal). This structure of steering lock is still not satisfactory in function because it may slip from the steering wheel if it is not tightly fastened up, or damage the brake pedal (or accelerator pedal) when it is tightly fastened up. Another drawback of this structure of steering lock is its weak structural strength, and therefore it may be broken easily by force.

FIG. 2 shows another structure of automobile steering lock according to the prior art, which is generally comprised of a lock body, and two lock bolts respectively fastened to the lock body at two opposite sides and having each an outward hook respectively hooked on the periphery of the steering wheel at either side. This structure of automobile steering lock is not very strong, and therefore the lock bolts may be broken easily by force.

FIG. 3 shows a gear shifting lever lock according to the prior art, which is generally comprised of a L-shaped mounting frame affixed to the console of the automobile near the gear shifting lever, a lock body fastened to the L-shaped mounting frame and having the shackle mounted around the gear shifting lever to stop it from being moved. This structure of gear shifting lever lock needs a special technique to install. While fastening the L-shaped mounting frame to the console the structure and coating of the console will be damaged. Furthermore, this structure of gear shifting lever lock is very expensive.

SUMMARY OF THE INVENTION

According to one aspect of the present invention, the automobile steering lock is comprised of a lock body having a spring plate at the top, a substantially U-shaped mounting frame having one side hinged to the lock body and a second side made with two spaced through holes, a locating bar having two parallel lock bolts perpendicularly extended from a coupling end thereof and respectively inserted through the through holes on the mounting frame and locked in two lock holes on the lock body permitting the spring plate of the lock body and the mounting frame to be stopped against an automobile's steering wheel at two opposite sides to lock it in position as the locating bar is stopped between the instrument panel and windshield of the automobile.

According to another aspect of the present invention, the coupling end extends from the locating bar at about 15° angle, and therefore the locating bar can be stopped between the instrument panel and windshield of the automobile as the lock body and the mounting frame are fastened around the periphery of the steering wheel.

According to still another aspect of the present invention, a spring plate is provided and affixed to the lock body at the top, having two opposite side wings. When the mounting frame is fastened to the periphery of the steering wheel at the top, the side wings of the spring plate stop against the periphery of the steering wheel at the bottom, and therefore the steering wheel is tightly retained in position.

DETAILED DESCRIPTION OF THE PREFERRED EMBODIMENT

Figure 2:
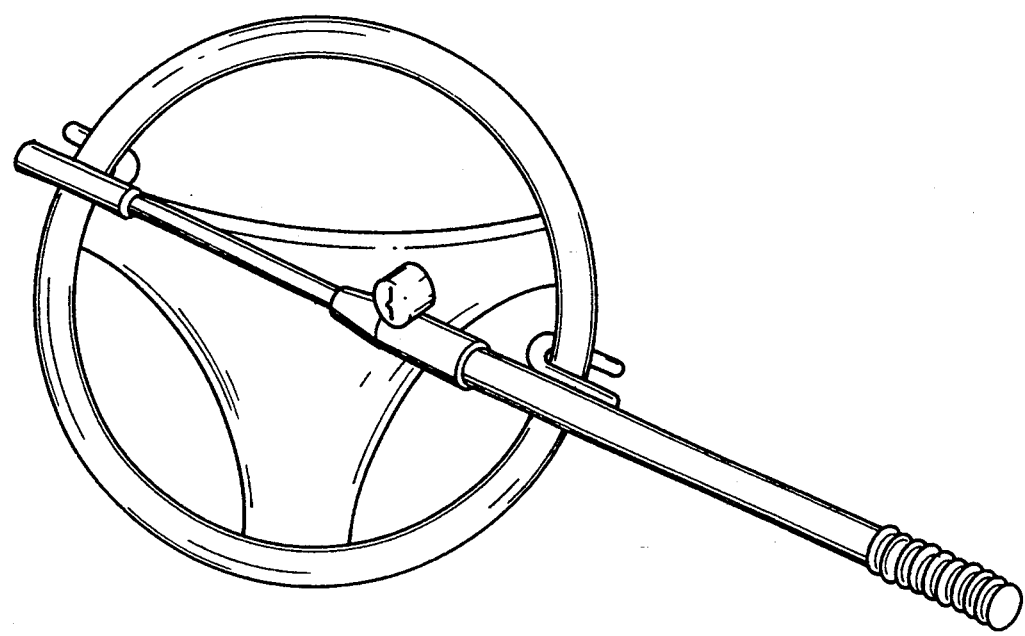
FIG. 2 shows another structure of automobile steering lock according to the prior art.
Figure 1:
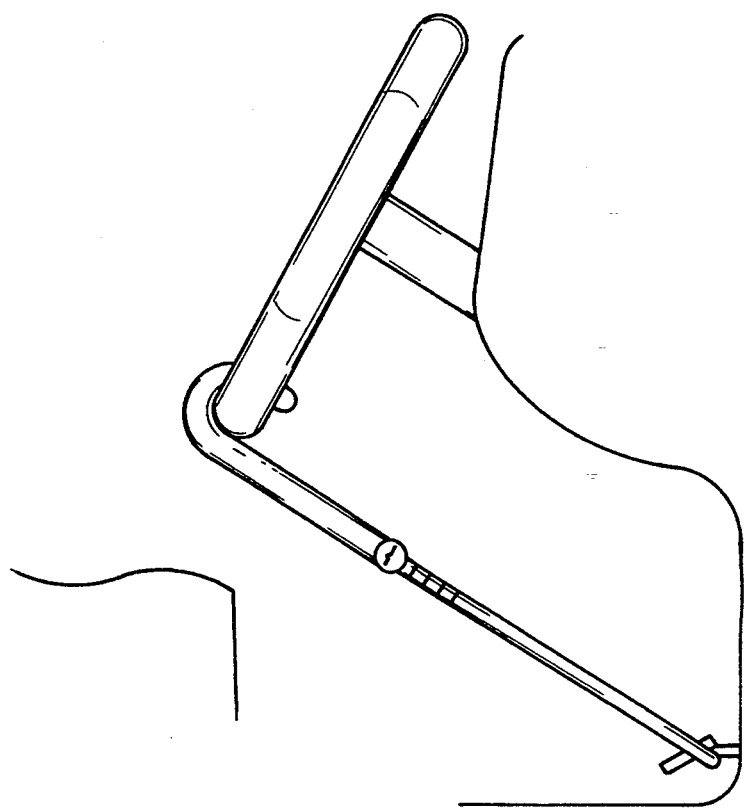
FIG. 1 shows an automobile steering lock according to the prior art.
Figure 3:
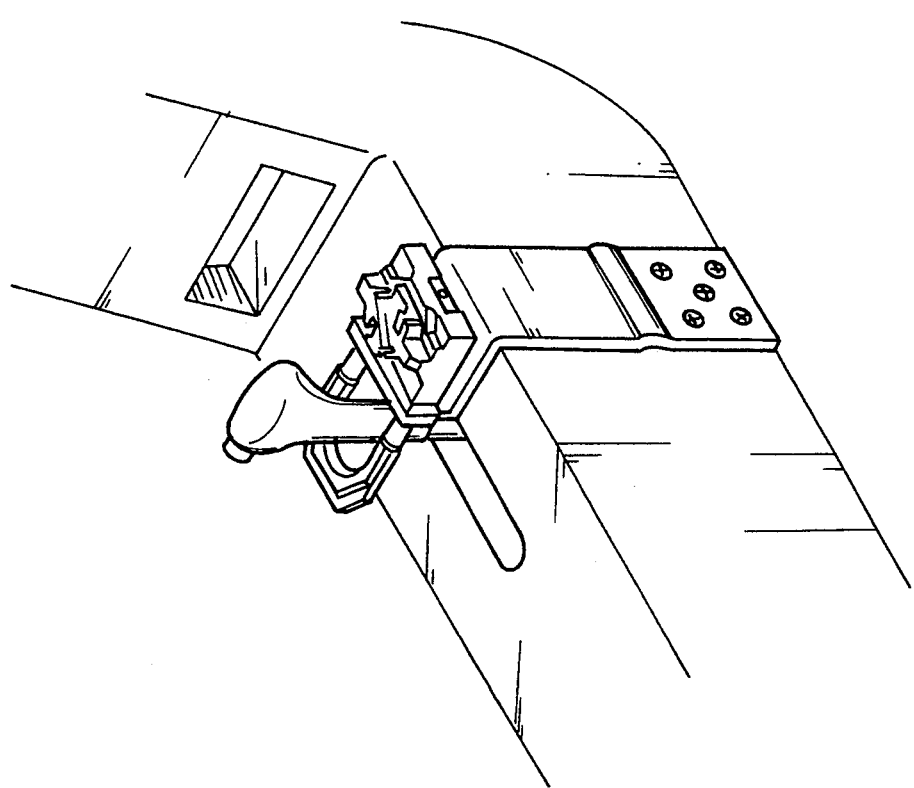
FIG. 3 shows a gear shifting lever lock according to the prior art.
Figure 4:
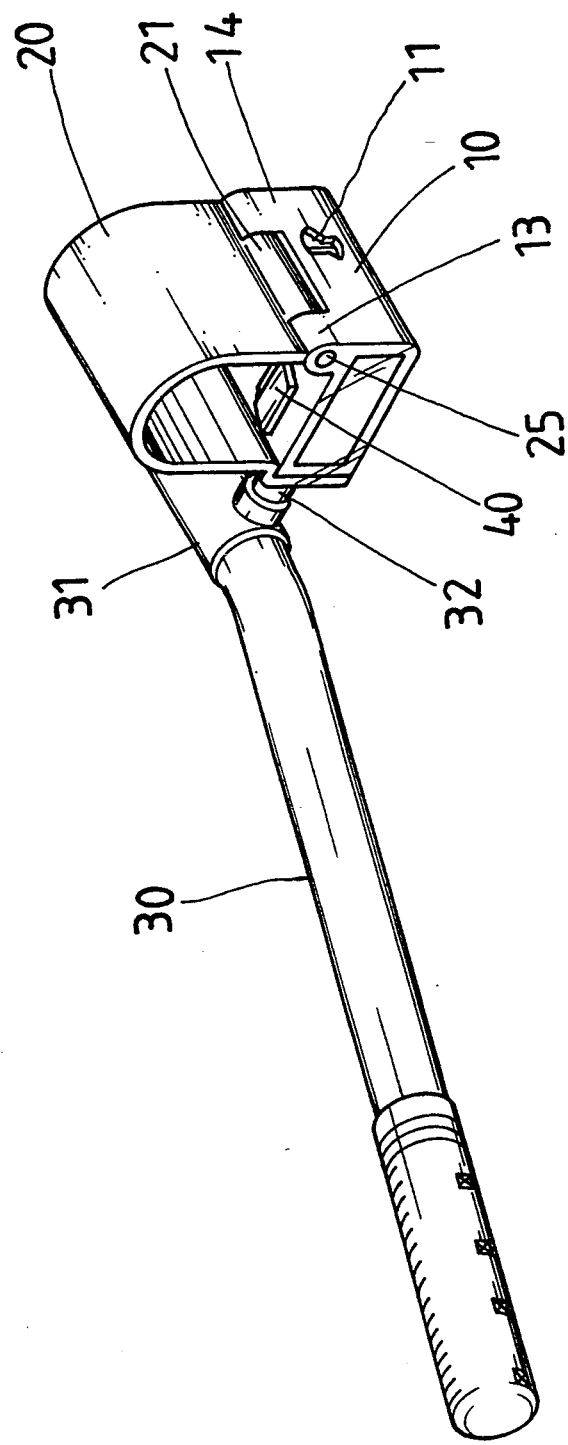
FIG. 4 is an elevational view of an automobile steering lock according to the preferred embodiment of the present invention.
Figure 5:
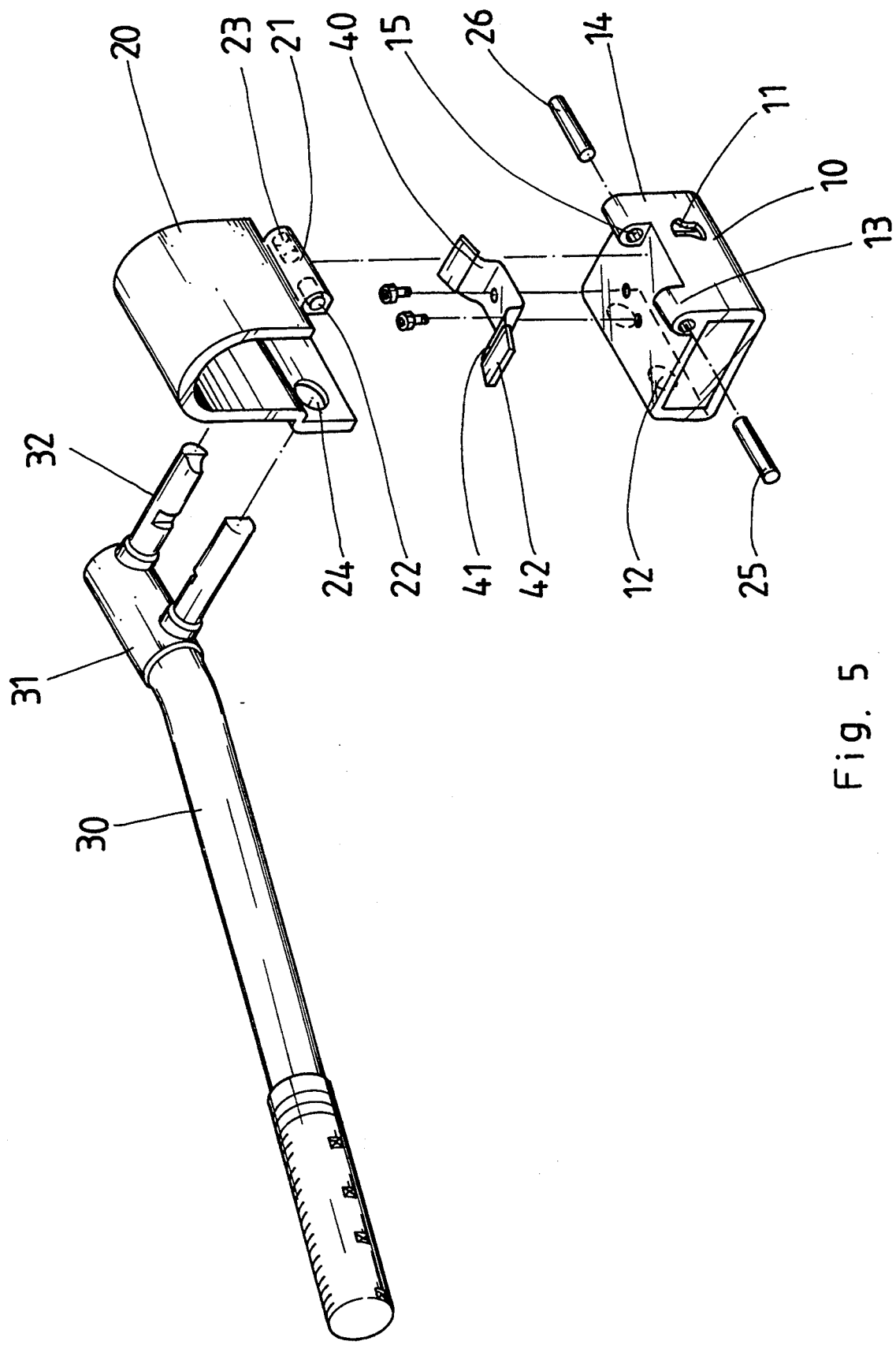
FIG. 5 is an exploded view of the automobile steering lock shown in FIG. 4.

Referring to FIGS. 4 and 5, an automobile steering lock in accordance with the preferred embodiment of the present invention is generally comprised of a lock body 10, a mounting frame 20, and a locating bar 30. The lock body 10 comprises a key hole 11, two lock holes 12, and two barrels 13;14 longitudinally aligned at two opposite locations and defining a respective axle hole 15. The mounting frame 20 is shaped like a U-channel having an axle housing 21 at one side, which has two blind holes 22;23 on two opposite ends thereof, and two through holes 24 spaced at an opposite sides and disposed corresponding to the lock holes 12 on the lock body 10. By inserting two pivot pins 25;26 through the axle holes 12;15 into the blind holes 22;23 respectively, the mounting frame 20 is hinged to the lock body 10. The locating bar 30 comprises two parallel lock bolts 32 perpendicularly extended from a coupling end 31 thereof. The coupling end 31 extends obliquely outwardly from the locating bar 30 in the longitudinal direction (preferably at about 15° angle). The distance between the lock bolts 32 is equal to that between the two lock holes 12. By inserting the two lock bolts 32 of the locating bar 30 through the through holes 24 on the mounting frame 20 into the lock holes 12 on the lock body 10, the mounting frame 20 is locked in a closed position and covered over the lock body 10. When the mounting frame 20 is fastened to the steering wheel and locked in the closed position, the locating bar 30 is stopped between the instrument panel and the windshield, and therefore the steering wheel is locked. In order to prohibit the mounting frame 20 from being moved on the steering wheel, a spring plate 40 is affixed to the upper portion of the lock body 10 for bearing against the steering wheel. The spring plate 40 comprises two side wings 41 disposed at two opposite ends of the open space defined within the mounting frame 20 and the lock body 10. The side wings 41 are covered with a respective rubber covering 42, and therefore the spring plate 40 does not damage the steering wheel when locked.

Figure 7:
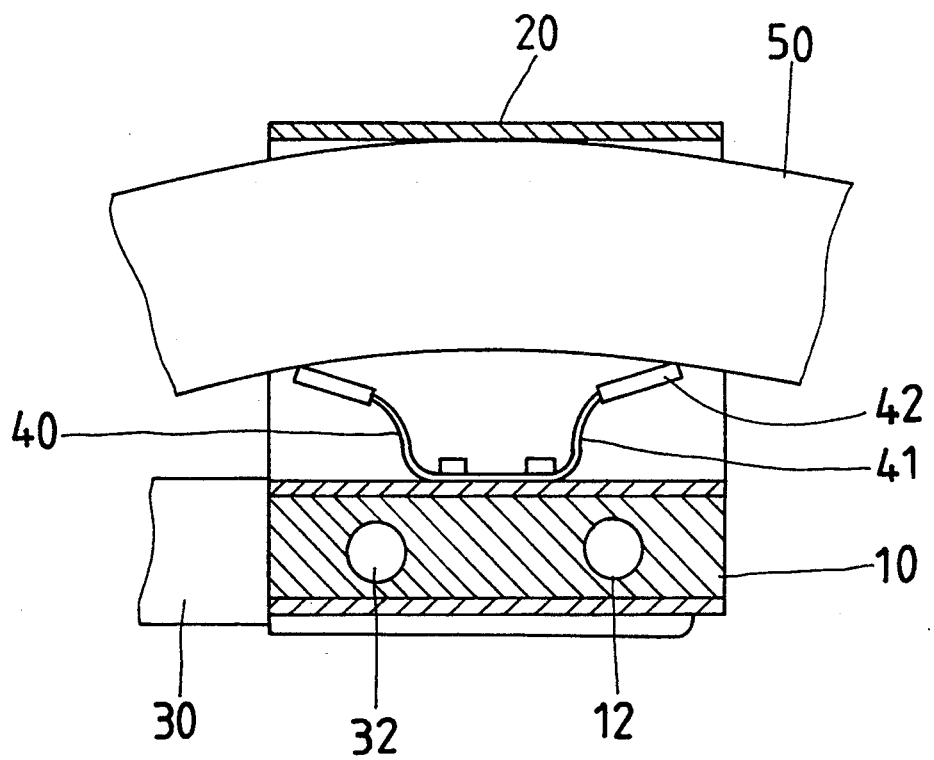
FIG. 7 is a longitudinal view in section of the automobile steering lock shown in FIG. 4.
Figure 6:
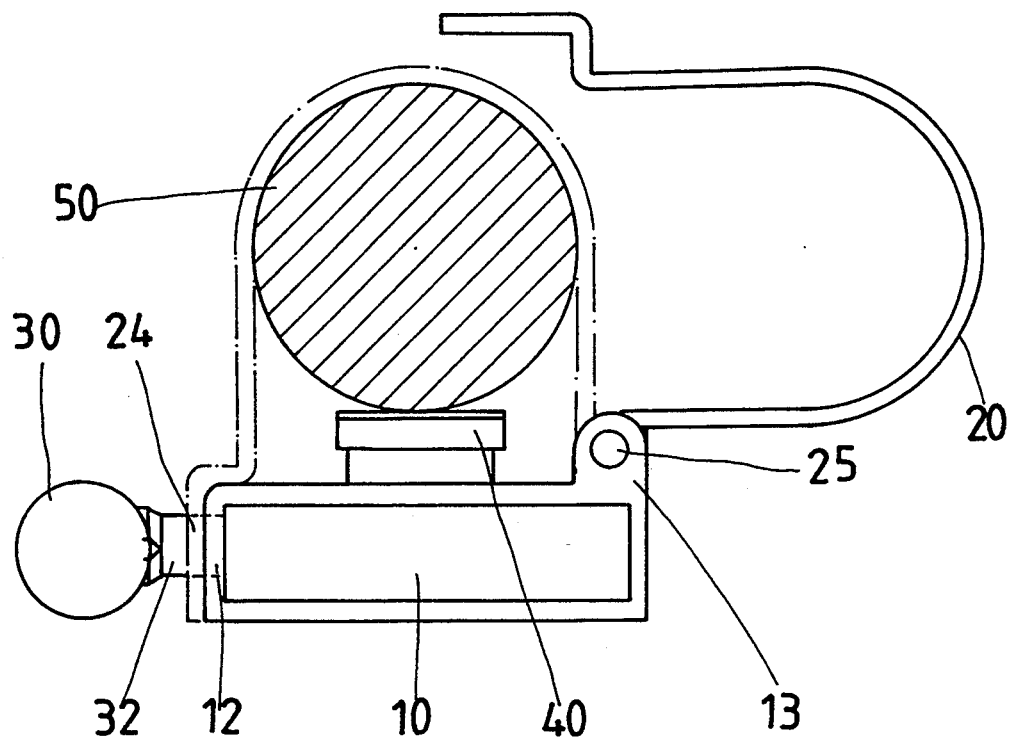
FIG. 6 is transverse view in section of the automobile steering lock shown in FIG. 4.
Figure 8:
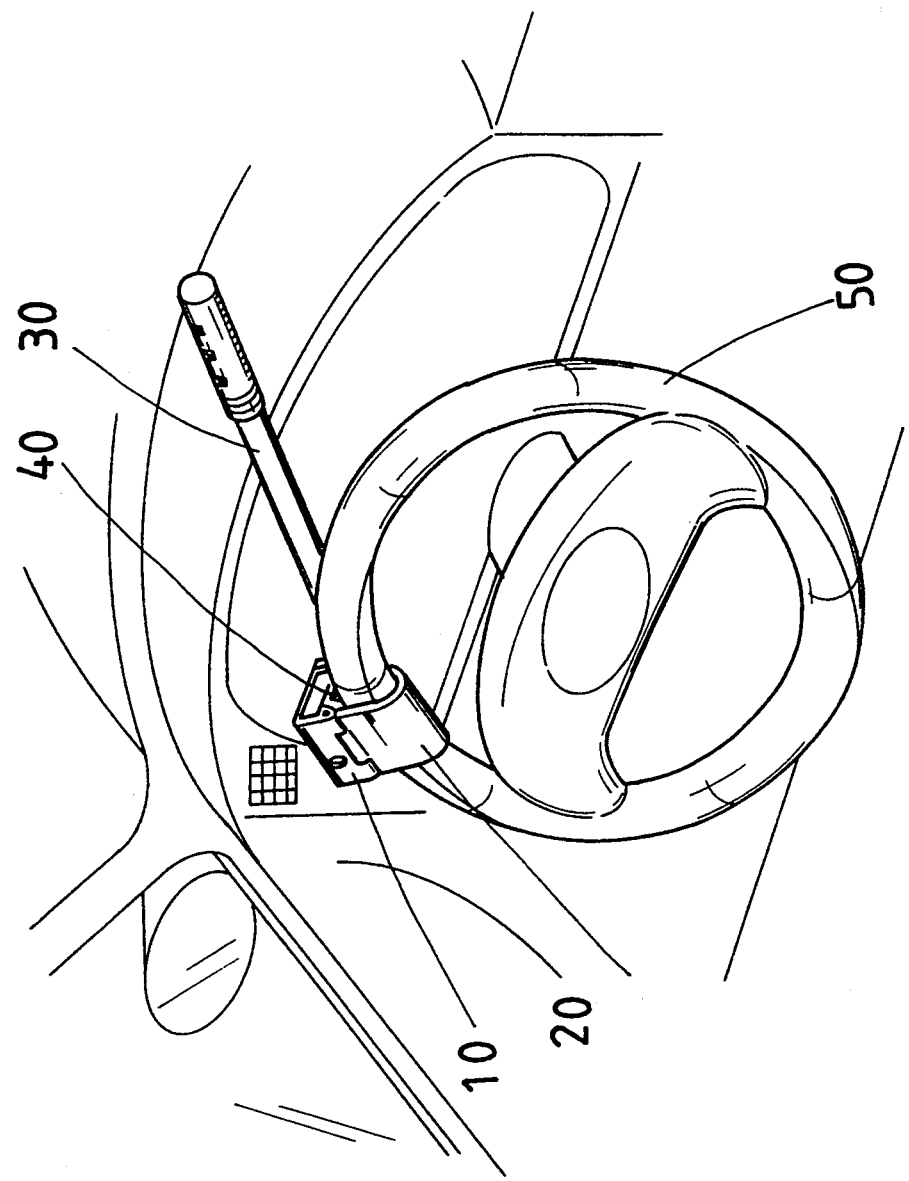
FIG. 8 is an installed view showing the automobile steering lock mounted on an automobile's steering wheel and locked.

Referring to FIGS. 6, 7, and 8, because the mounting frame 20 is hinged to the lock body 10, it can be opened from the lock body 10 or closed on the lock body 10. As the mounting frame 20 is opened, the spring plate 40 is attached to the periphery of the steering wheel 50 at the bottom thereof, then the mounting frame 20 is closed on the lock body 10 and covered over the periphery of the steering wheel 50, and then the lock bolts 32 of the locating bar 30 are respectively inserted through the through holes 24 into the lock holes 12 and locked in position, and therefore the steering wheel is locked. By inserting the key into the key hole 11 to unlock the lock bolts 32, the locating bar 30 is removed from the mounting frame 20 and the lock body 10, then the mounting frame 20 is opened from the lock body 10, and then the mounting frame 20 and the lock body 10 are removed from the steering wheel 50.

As indicated, the present invention provides an automobile steering lock which is easy to install and practical in use. While only one embodiment of the present invention has been shown and described, it will be understood that various modifications and changes could be made without departing from the spirit and scope of the invention.

I claim:

1. An automobile steering lock comprising:
    a lock body having a key hole on a first side thereof, and two lock holes spaced on a second side thereof;
    a substantially U-shaped mounting frame having a first side hinged to the first side of said lock body and a second side made with two spaced through holes; and
    a locating bar having two parallel lock bolts perpendicularly extended from a coupling end thereof and respectively inserted through the through holes on said mounting frame and locked in the lock holes on said lock body permitting said lock body and said mounting frame to be mounted on an automobile's steering wheel to lock it in position, said locating bar being provided for bearing against the instrument panel and windshield of the automobile.

2. The automobile steering wheel of claim 1 further comprising a spring plate affixed to said lock body for bearing against the steering wheel.

3. The automobile steering wheel of claim 2 wherein said spring plate comprises two side wings covered with a respective rubber covering.

4. The automobile steering wheel of claim 3 wherein the mounting frame includes an open space formed therein and having two opposite ends, the two side wings of said spring plate are disposed at the two opposite ends of the open space defined within said mounting frame and respectively bearing against the periphery of the steering wheel.

5. The automobile steering wheel of claim 1 wherein said lock body comprises two barrels spaced along the first side; said mounting frame comprises an axle housing at the first side and connected between the two barrels on said lock body by two pivot pins, said axle housing of said mounting frame having two blind holes on two opposite ends thereof into which either pivot pin inserts.

6. The automobile steering lock of claim 1 wherein said coupling end extends obliquely outwardly from said locating bar at about 15° angle.

* * * * *